United States Patent [19]
Watters

[11] Patent Number: 6,079,936
[45] Date of Patent: Jun. 27, 2000

[54] PERSONAL WATERCRAFT CARRIER WITH LOWERING AND LIFTING CAPABILITY

[76] Inventor: Kenneth E. Watters, 5151 Connors La., Highland, Mich. 48356

[21] Appl. No.: 09/109,519

[22] Filed: Jul. 2, 1998

[51] Int. Cl.⁷ .................................................. B60P 3/10
[52] U.S. Cl. .............................. 414/680; 224/403; 405/7
[58] Field of Search .................................. 414/680, 462, 414/471, 477, 482, 546, 589; 224/403, 404, 405; 405/3, 7; 114/44; 280/414.1

[56] References Cited

U.S. PATENT DOCUMENTS

| | | | |
|---|---|---|---|
| 3,753,355 | 8/1973 | Knoch | 405/3 |
| 4,850,741 | 7/1989 | Timmerman | 405/3 |
| 4,932,830 | 6/1990 | Woodburn | 414/495 |
| 5,005,846 | 4/1991 | Taylor | 280/30 |
| 5,016,893 | 5/1991 | Hart, Jr. | 280/35 |
| 5,249,545 | 10/1993 | Gettman | 114/259 |
| 5,249,910 | 10/1993 | Ball | 414/538 |
| 5,468,115 | 11/1995 | Alvis | 414/462 X |
| 5,518,261 | 5/1996 | Godbersen | 280/414.1 |
| 5,772,388 | 6/1998 | Clark | 414/462 X |

Primary Examiner—F. J. Bartuska
Attorney, Agent, or Firm—Joseph N. Breaux

[57] ABSTRACT

A personal watercraft carrier having a watercraft cradle coupled to a support frame wherein the support frame has two vertical leg support members which are pivotally coupled to advance from an essentially horizontal position to an essentially vertical upright position or from an essentially vertical upright position to an essentially horizontal position. When the vertical leg support members are advance to the essentially horizontal position, the cradle is in close proximity to the ground or other horizontal surface which enables the user to easily mount the personal watercraft in the cradle. The pivotal translation of the vertical leg support members from the horizontal position to the vertical upright position lifts the cradle having placed therein the personal watercraft.

18 Claims, 3 Drawing Sheets

PERSONAL WATERCRAFT CARRIER WITH LOWERING AND LIFTING CAPABILITY

TECHNICAL FIELD

The present invention relates to personal watercraft carriers and, more particularly, to a personal watercraft carrier having a cradle, for supporting therein a personal watercraft, coupled to a support frame wherein the support frame has two vertical leg support members which are pivotally coupled to advance from an essentially horizontal position to an essentially vertical upright position or from an essentially vertical upright position to an essentially horizontal position. When the vertical leg support members are advance to the essentially horizontal position, the cradle is in close proximity to the ground or other horizontal surface which enables the user to easily mount the personal watercraft in the cradle. The pivotal translation of the vertical leg support members from the horizontal position to the vertical upright position lifts the cradle having placed therein the personal watercraft.

BACKGROUND OF THE INVENTION

Personal walercrafts such as jet skis have become very popular. In order to transport the personal watercrafts, trailers and transport carriers have been designed to accommodate one or two individual personal watercrafts. I have designed a personal watercraft carrier which carries a single personal watercraft and can be used with other transport carriers to increase the number of personal watercrafts a trailer can carry. Moreover, my personal watercraft carrier can be used alone.

Several devices have been patented which are aimed at watercraft carriers and watercraft trailers.

U.S. Pat. No. 5,518,261, to Godbersen, entitled "PERSONAL WATERCRAFT TRAILER" discloses a trailer having wheels and an axle support frame having a pair of parallel, longitudinally extended frame portions interconnected at their rear ends, and with longitudinally spaced pair of V-shaped bracket units mounted on each frame portion. Each pair of bracket units support a pair of elongated, laterally spaced, parallel pair of bunks for supporting a single personal watercraft.

U.S. Pat. No. 5,249,910, to Hall, entitled "VEHICLE MOUNTED SELF-LOADING AND CARRYING APPARATUS" discloses a self-loading and carrying apparatus which includes longitudinal extruded frame members with transverse end members mounted on a pick-up truck.

U.S. Pat. No. 5,249,545, to Gettman, entitled "PERSONAL WATERCRAFT CRADLE AND METHOD OF USE" discloses a lightweight cradle system for use in launching, beaching, transporting and storing a personal watercraft. The cradle system has hollow side pipes oriented in, typically, a generally "V" shaped configuration, which hollow side pipes converge toward a typically rounded interconnection point. A plurality of rollers are provided and are coupled between the hollow side pipes. The cradle system further comprises side supports with pads coupled to the hollow side pipes to cradle the personal watercraft.

U.S. Pat. No. 5,016,893, to Hart, Jr., entitled "COLLAPSIBLE SUPPORT AND TRANSPORT STAND FOR PERSONAL WATERCRAFT" discloses a collapsible support and transport stand for supporting a personal watercraft. The stand includes a cradle and a plurality of telescoping legs which extend to a pair of skids having a plurality of spring biased retractable wheels. The telescoping legs are maintained in their support position transverse to the cradle by telescoping cross members. The cross members are removably to allow the legs to pivot to a stowed position underneath the cradle. When the leg members are pivoted to collapse the support and transport stand, the leg members of one side overlap the legs of the other side. Furthermore, when the leg members are pivoted, the personal watercraft should be removed so that the stand can be collapsed. Therefore, the stand of Hart, Jr. is not capable of pivoting the legs lift or lower the cradle with the personal watercraft supported in the cradle, as does the present invention.

U.S. Pat. No. 5,005,846, to Taylor, entitled "JET SKI TRANSPORTER CARRIAGE AND RELATED METHODS" discloses a transporter carriage having rails forming part of a framework which are shaped to compatibly receive a jet ski, and releasably interchangeable support systems which provide carriage support and mobility.

U.S. Pat. No. 4,932,830, to Woodburn, entitled "MOTOR VEHICLE AND BOAT TAILER" discloses a trailer which supports a car and a frame structure which allows a boat to be supported above the car.

While each of the above personal watercraft carriers and trailers function as desired, none of them have a personal watercraft carrier having a cradle, for supporting therein a personal watercraft, coupled to a support frame wherein the support frame has two vertical leg support members which are pivotally coupled to advance from an essentially horizontal position to an essentially vertical upright position or from an essentially vertical upright position to an essentially horizontal position; wherein when the vertical leg support members are advance to the essentially horizontal position, the cradle is in close proximity to the ground or other horizontal surface which enables the user to easily mount the personal watercraft in the cradle; and wherein the pivotal translation of the vertical leg support members from the horizontal position to the vertical upright position lifts the cradle having placed therein the personal watercraft.

As will be seen more fully below, the present invention is substantially different in structure, methodology and approach from that of the prior personal watercraft carriers.

SUMMARY OF THE INVENTION

The preferred embodiment of the personal watercraft carrier of the present invention solves the aforementioned problems in a straight forward and simple manner. What is provided is a personal watercraft carrier having a cradle, for supporting therein a personal watercraft, coupled to a support frame wherein the support frame has two vertical leg support members which are pivotally coupled to advance from an essentially horizontal position to an essentially vertical upright position or from an essentially vertical upright position to an essentially horizontal position. When the vertical leg support members are advance to the essentially horizontal position, the cradle is in close proximity to the ground or other horizontal surface which enables the user to easily mount the personal watercraft in the cradle. The pivotal translation of the vertical leg support members from the horizontal position to the vertical upright position lifts the cradle having placed therein the personal watercraft.

In general, the personal watercraft carrier of the present invention comprises: a cradle for supporting therein a personal watercraft and having a lowered cradle position and a raised cradle position; and, a support frame having a horizontal cross bar member which supports said cradle and first and second parallelly spaced vertical leg support members pivotally coupled to a respective end of said horizontal cross bar member wherein said first and second parallelly spaced vertical leg support members are adapted to advance in unison from a horizontal position to a vertically upright position to raise said cradle to said raised cradle position and to advance in unison from said vertically upright position to said horizontal position to lower said cradle to said lowered cradle position.

More specifically, the personal watercraft carrier of the present invention comprises: first and second horizontal support members; first vertical leg support member having one end pivotally coupled to a center said first horizontal support member; second vertical leg support member having one end pivotally coupled to a center of said second horizontal support member; a horizontal cross bar member having a forward end channel member and a rear end channel wherein said first vertical leg support member is pivotally coupled in said forward end channel and said second vertical leg support member is pivotally coupled in said rear end channel; and, a cradle coupled to said horizontal cross bar member for supporting therein a personal watercraft carrier wherein said first and second vertical leg support members are adapted to pivotally advance from an essentially horizontal position to an essentially vertical upright position for raising said cradle and to pivotally advance from said essentially vertical upright position to said essentially horizontal position to lower said cradle.

In view of the above, an object of the present invention is to provide a personal watercraft carrier which can be used to modify an existing double personal watercraft carrier trailer with a third carrier for transporting a third personal watercraft carrier. Nevertheless, the personal watercraft carrier can be used alone.

Another object of the present invention is to provide a personal watercraft carrier which includes a support frame having two vertical leg support members which are pivotally coupled to advance from an essentially vertical upright position to an essentially horizontal position to collapse the personal watercraft carrier so that the personal watercraft carrier can be easily stowed away.

A further object of the present invention is to provide a personal watercraft carrier which includes d generally V-shaped watercraft cradle which supports therein a personal watercraft, such as, a jet ski or the like.

It is a still further object of the present invention to provide a personal watercraft carrier which has a lowered craft position wherein the lowered craft position allows the personal watercraft to be easily placed in the cradle.

It is a still further object of the present invention to provide a personal watercraft carrier which has a raised cradle position to raise the personal watercraft while in the cradle. Moreover, the raised cradle position serves to allow existing double personal watercraft trailers to support a third personal watercraft via the personal watercraft carrier above the other two personal watercrafts.

It is a still further object of the present invention to provide a personal watercraft carrier having an anchor point member having an aperture formed therein for coupling a winch cable of a winch to the anchor point member. The winch serves as a means for lowering and raising the cradle to and from the lowered cradle position and the raised cradle position.

In view of the above objects, it is a feature of the present invention to provide a personal watercraft carrier which is simple to use.

Another feature of the present invention is to provide a personal watercraft carrier which is relatively simple structurally and simple to manufacture.

A further feature of the present invention is to provide a personal watercraft carrier which is sturdy and durable.

The above and other objects and features of the present invention will become apparent from the drawings, the description given herein, and the appended claims.

BRIEF DESCRIPTION OF DRAWINGS

For a further understanding of the nature and objects of the present invention, reference should be had to the following detailed description, taken in conjunction with the accompanying drawings, in which like elements are given the same or analogous reference numbers and wherein.

DESCRIPTION OF THE EXEMPLARY EMBODIMENT

Figure 3:
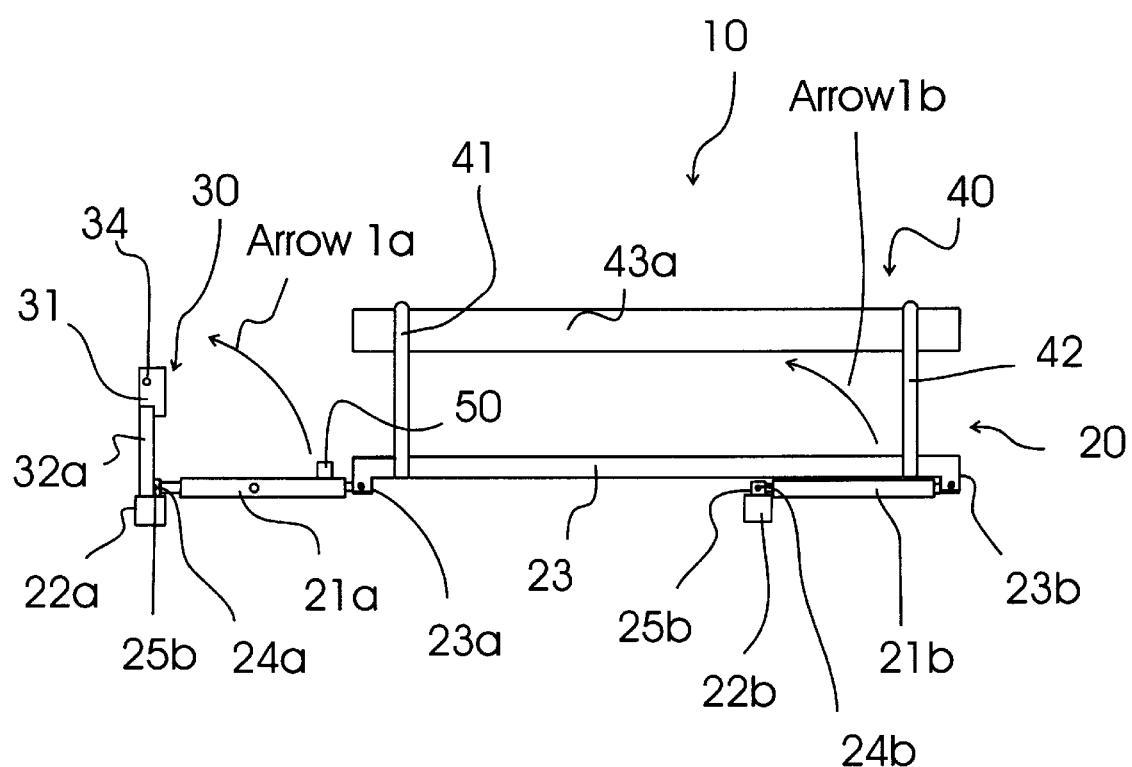

Referring now to the drawings, and in particular FIGS. 3, the personal watercraft carrier of the present invention is designated generally by the numeral 10. Personal watercraft carrier 10 is comprised of support frame 20, cradle 40, safety bar coupler 50 and anchor point member 60.

Support frame 20 comprises first and second vertical leg support members 21a and 21b, first and second horizontal support members 22a and 22b, horizontal cross bar member 23, and leg bracing means 30. One end of first and second vertical leg support members 21a and 21b are pivotally coupled perpendicularly to first and second horizontal support members 22a and 22b, respectively via pivot means 24a and 24b, respectively. First and second horizontal support members 22a and 22b serve as horizontal supports to stabilize support frame 20 on an essentially horizontal surface.

First and second horizontal support members 22a and 22b each have centrally coupled thereto first and second channel members 25a and 25b, respectively. Said one end of first vertical leg support member 21a is received in first channel member 25a and is pivotally coupled therein via pivot means 24a. In general, first channel member 25a includes two vertically upright surfaces in parallel spaced relation and vertically extend along the front and back sides of first vertical leg support member 21a. Likewise, said one end of second vertical leg support member 21b is received in second channel member 25b and is pivotally coupled therein via pivot means 24b. In general, second channel member 25b includes two vertically upright surfaces in parallel spaced relation and vertically extend along the front and back sides of second vertical leg support member 21b.

In the preferred embodiment, first and second horizontal support members 22a and 22b are secured to a personal watercraft trailer (not shown). First horizontal support member 22a has an aperture 29a formed in one end and aperture 29a' formed in the other end. Apertures 29a and 29a' each receive therein a respective bolt (not shown) for securing first horizontal support member 22a to the trailer. Likewise, second horizontal support member 22b has an aperture 29b formed in one end and aperture 29b' formed in the other end. Apertures 29b and 29b' each receive therein a respective bolt (not shown) for securing second horizontal support member 22b to the trailer.

As shown in the exemplary embodiment, said one end of first vertical leg support member and said one end of second vertical leg support member has a reduced outer perimeter.

The other end of first and second vertical leg support members 21a and 21b are pivotally coupled to a respective distal end of horizontal cross bar member 23 via first and second pivot means 26a and 26b. Each respective distal end of horizontal cross bar member 23 has an opening in the under side of horizontal cross bar member 23 and includes front and back vertical surfaces extending downward to create forward channel 23a and rear channel 23b. The forward channel 23a of horizontal cross bar member 23 receives therein the other end of first vertical leg support member 21a which is pivotally coupled therein via pivot means 26a. The rear channel 23b of horizontal cross bar member 23 receives therein the other distal end of second vertical leg support member 21b which is pivotally coupled therein via pivot means 26b. Therefore, first and second vertical leg support members 21a and 21b are in parallel spaced relation when vertically upright.

Figure 1:
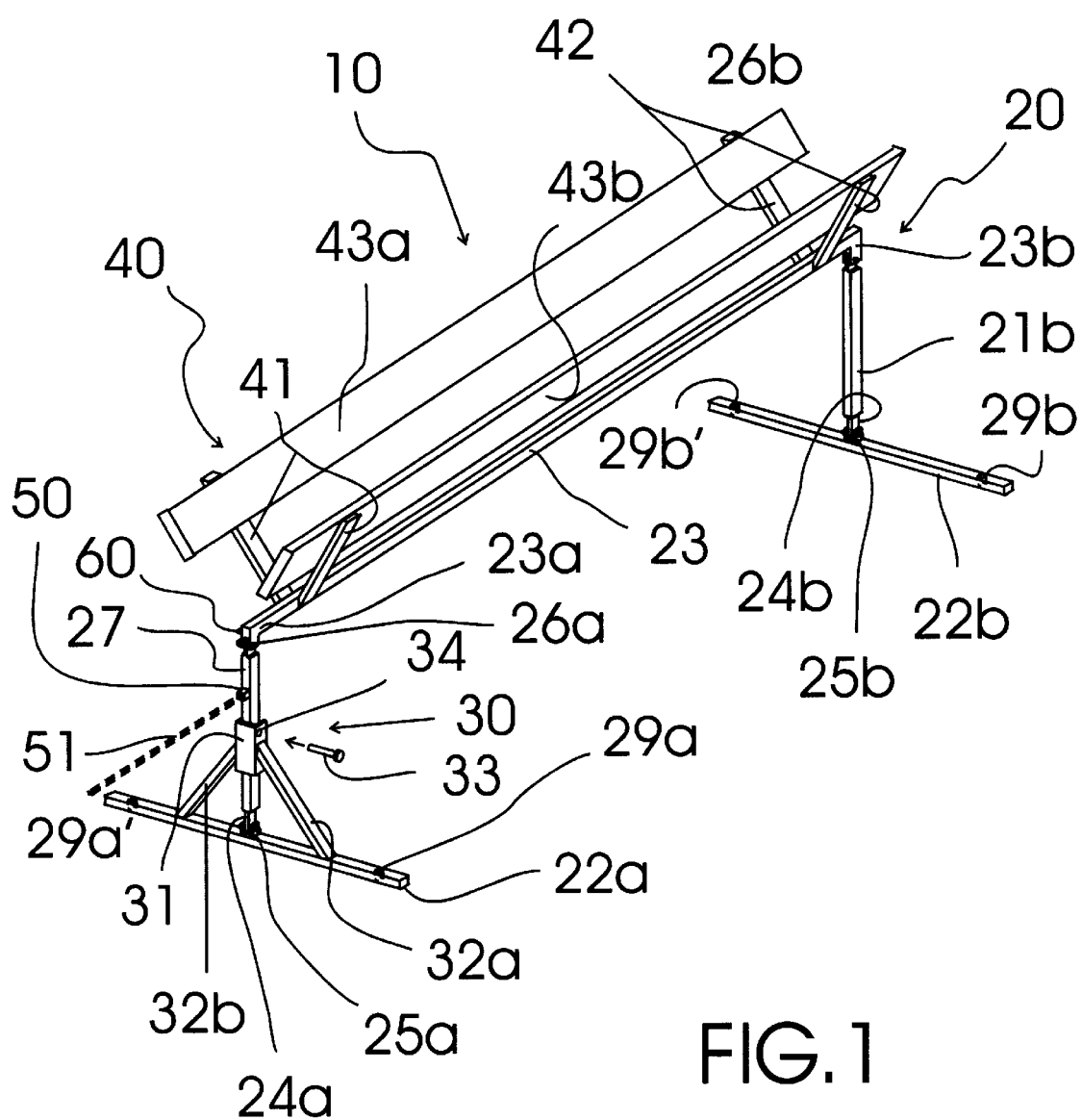
FIG. 1 illustrates a front perspective view of the preferred embodiment of the personal watercraft carrier of the present invention.
Figure 2:
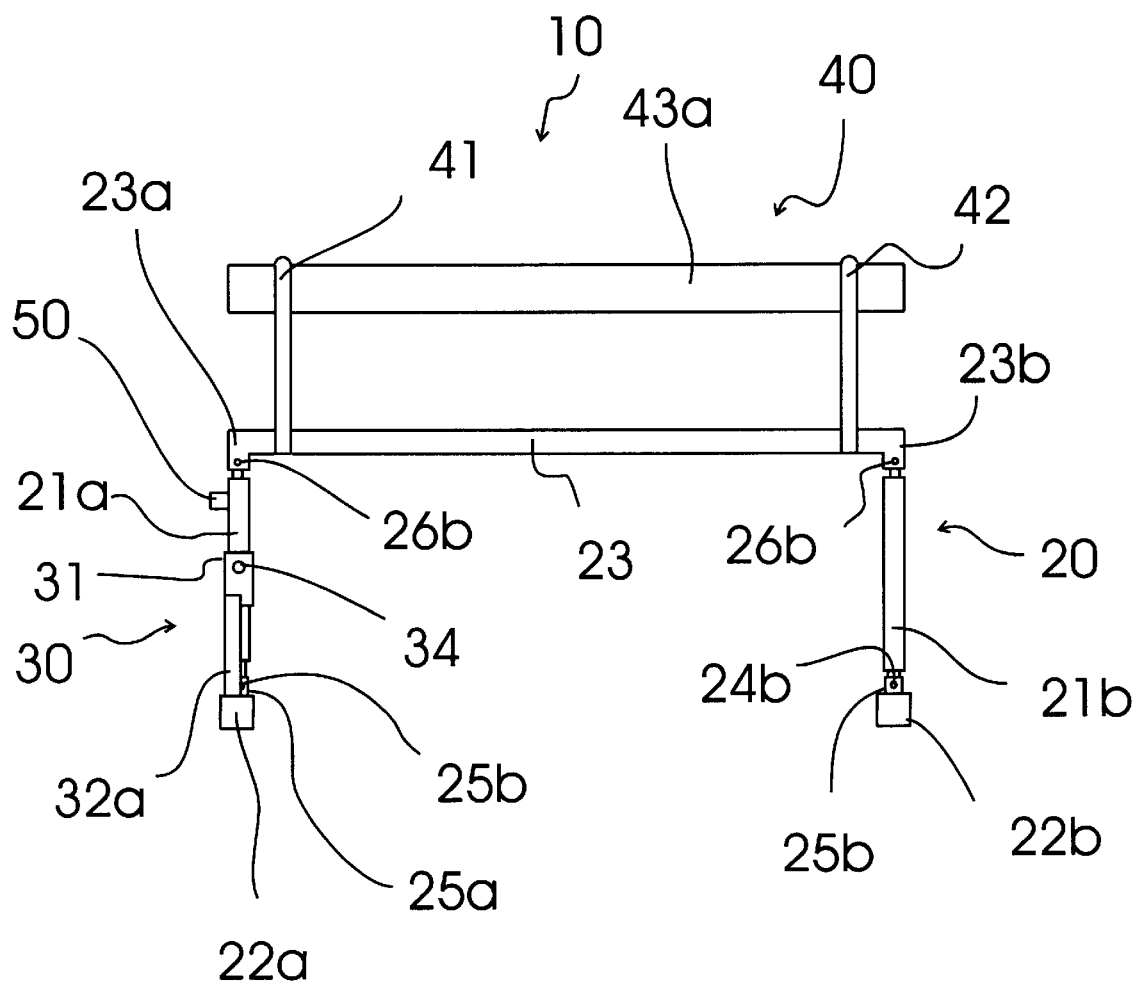
FIG. 2 illustrates a side view of the personal watercraft carrier in the raised cradle position; and, FIG. 3 Illustrates a side view of the personal watercraft carrier in the lowered cradle position.

In operation, the pivotal couplings of first and second vertical leg support members 21a and 21b to forward channel 23a and rear channel 23b, respectively, of horizontally cross bar member 23 and to first and second horizontal support members 22a and 22b, respectively, allow first and second vertical leg support members 21a and 21b to pivot rearwardly in unison from an essentially vertically upright position, as best seen in FIG. 2, to an essentially horizontal position. Likewise such pivotal couplings allow first and second vertical leg support members 21a and 21b to pivot forwardly in unison in the direction of ARROWS 1a and 1b from an essentially horizontal position, as best seen in FIG. 3, to the essentially vertically upright position, shown in FIG. 2.

When first and second vertical leg support members 21a and 21b are in the horizontal position, cradle 40 is in a lowered cradle position. When first and second vertical leg support members 21a and 21b are in the vertical position, cradle 40 is in the raised cradle position.

Leg bracing means 30 serves to maintain first vertical leg support member 21a vertically upright and prevents first vertical leg support member 21a from pivoting rearwardly when first vertical leg support member 21a is locked in leg bracing means 30. As can be appreciated, since first and second vertical leg support members 21a and 21b pivot in unison, the bracing of first vertical leg support member 21a via leg bracing means 30 not only prevents first vertical leg support member 21a from pivoting but also prevents second vertical leg support member 21b from pivoting even though not directly coupled to second vertical leg support member 21b.

Leg bracing means 30 comprises central coupler 31 dimensioned to receives therein first vertical leg support member 21a and first and second angled support bars 32a and 32b. One end of first and second angled support bars 32a and 32b are coupled to the front and back sides, respectively, of central coupler 31. First and second angled support bars 32a and 32b flare outward and are fixed attached to first horizontal support member 22a. Thereby, first and second angle support bars 32a and 32b maintain central coupler 31 a predetermined distance above first horizontal support member 22a and stabilizes first vertical leg support member 21a vertically upright.

Front and back sides of central coupler 31 have formed therein aligned apertures 34 for receiving therein locking pin 33. Locking pin 33 is journalled through the front side through first vertical leg support member 21a and through the back side of central coupler 31. Locking pin 33 secures (locks) first vertical leg support member 21a in central coupler 31 to prevent first vertical leg support member 21a from pivoting from its vertically upright position.

Front and back sides of central coupler 31 are in parallel spaced relation via fixed coupled cross member wherein central coupler 31 is generally U-shaped wherein fixedly coupled cross member is coupled parallel to forward surface 27 of first vertical leg support member 21a.

First vertical leg support member 21a has coupled to forward vertical surface 27a safety bar coupler 50 for coupling safety bar 51 shown in phantom. The back side surface of forward channel 23a has fixedly attached thereto anchor point member 60. Anchor point member 60 has an aperture formed therein for coupling a winch (not shown) thereto. In operation, when the winch can be used to lower and raise personal watercraft carrier 10 from the horizontal position to the vertical position or from the vertical position to the horizontal position.

Cradle 40 is essentially V-shaped and includes a first pair of angled bracket members 41 fixedly coupled to horizontal cross bar member 23 and a second pair of angled bracket members 42 spaced from first pair of angled bracket members 4L. While the exemplary embodiment provides for two pairs of bracket member, more than two pairs of bracket members may be provided. Cradle 40 further comprises first and second cross bar members 43a and 43b. First cross bar member 43a is coupled to the outer end of a first member of the first and second pairs of bracket members. Second cross bar member 43b is coupled to the outer end of a second member of the first and second angled bracket members.

In the preferred embodiment, first and second cross bar members 43a and 43b are, preferably, lined with indoor-outdoor carpet to protect the personal watercraft. Nevertheless, other material may be substituted which would prevent the formation of scratches along the sides of the personal watercraft.

In operation, the pivotal couplings of first and second vertical leg support members 21a and 21b to first and second horizontal support members 22a and 22b and to horizontal cross bar member 23 allows first and second vertical leg support members 21a and 21b to pivotal rotate (advance) from an essentially horizontal position to an essentially vertical upright position or from an essentially vertical upright position to an essentially horizontal position. When first and second vertical leg support members 21a arid 21b are advance to the essentially horizontal position, the cradle 40 is in close proximity to the ground or other horizontal surface which enables the user to easily mount the personal watercraft in cradle 40. The pivotal translation of first and second vertical leg support members 21a and 21b from the horizontal position to the vertical upright position lifts cradle 40. Therefore, when the personal watercraft -is supported in watercraft cradle 40, the personal watercraft is likewise lifted.

As can be readily seen, when first and second vertical leg support members 21a and 21b are in the horizontal position, as best seen in FIG. 3, personal watercraft carrier 10 is collapsed and can be easily stowed away in such collapsed position.

Personal watercraft carrier 10 can be used alone arid coupled to a pickup-truck or can be used to modify an existing double personal watercraft carrier trailer with a third carrier for transporting a third personal watercraft.

When unloading the personal watercraft from personal watercraft carrier 10, the trailer or truck in which personal watercraft carrier 10 is secured is backed into the water. In the preferred embodiment, personal watercraft carrier 10 is secured to a personal watercraft trailer or truck via first and second horizontal support members 22a and 22b. If the trailer is designed to transport two personal watercrafts, the two personal watercrafts are removed in the manner as required. Thereafter, the winch cable of the trailer winch is secured to anchor point member 60 and the winch cable is made slightly taut via the winch. Safety bar 51 which had been connected between safety bar coupler 50 and the trailer frame would be removed. Furthermore, Locking pin 33 should be removed to unlock first vertical leg support member 21a from central coupler 31 of leg bracing means 30.

Personal watercraft carrier 10 can then be lowered to the essentially horizontal position while the personal watercraft is in cradle 40 via the winch. The pivotal couplings of first and second vertical leg support members 21a and 21b allow first and second vertical leg support members 21a and 21b to pivot from the vertical upright position to the horizontal position to place the personal watercraft in a lowered craft position. Thereafter, the personal watercraft may be removed.

When placing the personal watercraft in cradle 40 for transport to a beach or the like, preferably, first and second vertical leg support members 21a and 21b of personal watercraft carrier 10 are placed in the horizontal position to lower cradle 40 into the lowered cradle position, as best seen in FIG. 3. The personal watercraft is placed in cradle 40 and secured to cradle 40 via at least one strapping member (not shown). Thereafter, the winch is coupled to anchor point member 60. As the winch cable is shortened, first and second vertical leg support members 21a and 21b are pivotally translated from the horizontal position to the vertical position. Thereby, cradle 40 is raised to the raised cradle position, as best seen in FIG. 2. First vertical leg support member 21a should then be locked in central coupler 31 via locking pin 33.

It is noted that the embodiment of the personal watercraft carrier described herein in detail, for exemplary purposes, is of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What is claimed is:

1. A personal watercraft carrier comprising:

a cradle for supporting therein a personal watercraft and having a lowered cradle position and a raised cradle position;

a support frame having a horizontal cross bar member which supports said cradle and first and second parallelly spaced vertical leg support members pivotally coupled to a respective end of said horizontal cross bar member wherein said first and second parallelly spaced vertical leg support members are adapted to advance in unison from a horizontal position to a vertically upright position to raise said cradle to said raised cradle position and to advance in unison from said vertically upright position to said horizontal position to lower said cradle to said lowered cradle position;

a first horizontal support member having pivotally coupled in a center thereof said first vertical leg support member;

a second horizontal support member having pivotally coupled in a center thereof said second vertical leg support member; and, a leg bracing means coupled to said first horizontal support member for securing said first vertical leg support member in said vertically upright position.

2. A personal watercraft carrier comprising:

first and second horizontal support members;

first vertical leg support member having one end pivotally coupled to a center said first horizontal support member;

second vertical leg support member having one end pivotally coupled to a center of said second horizontal support member;

a horizontal cross bar member having a forward end channel member and a rear end channel wherein said first vertical leg support member is pivotally coupled in said forward end channel and said second vertical leg support member is pivotally coupled in said rear end channel; and, a cradle coupled to said horizontal cross bar member for supporting therein a personal watercraft wherein said first and second vertical leg support members are adapted to pivotally advance from an essentially horizontal position to an essentially vertical upright position for raising said cradle and to pivotally advance from said essentially vertical upright position to said essentially horizontal position to lower said cradle.

3. The personal watercraft carrier of claim 2, further comprising:

a leg bracing means coupled to said first horizontal support member for bracing said first vertical leg support member when said first vertical leg support member is in said essentially vertical position; and, a means for locking said first vertical leg support member in said leg bracing means.

4. The personal watercraft carrier of claim 3, wherein said leg bracing means comprises:

a central coupler having a U-shape;

first angled support bar coupled to a first side of said central coupler and to said first horizontal support member; and, second angled support bar coupled to a second side of said central coupler and to said first horizontal support member wherein said first and second angled support bars position said central coupler a predetermined distance above said first horizontal support member.

5. The personal watercraft carrier of claim 4, wherein said locking means is a locking pin.

6. The personal watercraft carrier of claim 2, wherein said cradle is V-shaped and wherein said cradle comprises:

a first pair of angled bracket members fixedly coupled to said horizontal cross bar member;

a second pair of angled bracket members fixedly coupled to said horizontal cross bar member and spaced from said first pair of angled bracket members a first cross bar member coupled to an outer end of a first member of the first and second pairs of bracket members; and, a second cross bar member coupled to an outer end of a second member of the first and second angled bracket members.

7. The personal watercraft carrier of claim 6, wherein said cradle further comprises:

a first lining coupled to a surface of said first cross bar member; and, a second lining coupled to a surface of said second cross bar member.

8. The personal watercraft carrier of claim 2, further comprising a safety bar coupler coupled to a forward surface of said first vertical leg support member.

9. The personal watercraft carrier of claim 2, further comprising a anchor point member coupled to said a forward end of said horizontal cross bar member and having an aperture formed therein for coupling a winch thereto.

10. The personal watercraft carrier of claim 2, wherein said first horizontal support member has formed in one end thereof a first aperture for receiving therein a first bolt and the other end thereof a second aperture for receiving therein a second bolt; and, wherein said second horizontal support member has formed in one end thereof a first aperture for receiving therein a third bolt and the other end thereof a second aperture for receiving therein a fourth bolt.

11. A personal watercraft carrier comprising:

first and second horizontal support members;

first vertical leg support member having one end pivotally coupled to a center said first horizontal support member;

second vertical leg support member having one end pivotally coupled to a center of said second horizontal support member;

a horizontal cross bar member having a forward end channel member and a rear end channel wherein said first vertical leg support member is pivotally coupled in said forward end channel and said second vertical leg support member is pivotally coupled in said rear end channel;

a leg bracing means coupled to said first horizontal support member for bracing said first vertical leg support member when said first vertical leg support member is in said essentially vertical position;

a means for locking said first vertical leg support member in said leg bracing means; and, a cradle coupled to said horizontal, cross bar member for supporting therein a personal watercraft wherein said first and second vertical leg support members are adapted to pivotally advance from an essentially horizontal position Lo an essentially vertical upright position for raising said cradle and to pivotally advance from said essentially vertical upright position to said essentially horizontal position to lower said cradle.

12. The personal watercraft carrier of claim 11, wherein said leg bracing means comprises:

a central coupler having a U-shape;

first angled support bar coupled to a first side of said central coupler and to said first horizontal support member; and, second angled support bar coupled to a second side of said central coupler and to said first horizontal support member wherein said first and second angled support bars position said central coupler a predetermined distance above said first horizontal support member.

13. The personal watercraft carrier of claim 12, wherein said locking means is a locking pin.

14. The personal watercraft carrier of claim 11, wherein said cradle is V-shaped and wherein said cradle comprises:

a first pair of angled bracket members fixedly coupled to said horizontal cross bar member;

a second pair of angled bracket members fixedly coupled to said horizontal cross bar member and spaced from said first pair of angled bracket members a first cross bar member coupled to an outer end of a first member of the first and second pairs of backer members; and, a second cross bar member coupled to an outer end of a second member of the first and second angled bracket members.

15. The personal watercraft carrier of claim 14, wherein said cradle further comprises:

a first lining coupled to a surface of said first cross bar member; and, a second lining coupled to a surface of said second cross bar member.

16. The personal watercraft carrier of claim 11, further comprising a safety bar coupler coupled to a forward surface of said first vertical leg support member.

17. The personal watercraft carrier of claim 11, further comprising a anchor point member coupled to said a forward end of said horizontal cross bar member and having an aperture formed therein for coupling a winch thereto.

18. The personal watercraft carrier of claim 11, wherein said first horizontal support member has formed in one end thereof a first aperture for receiving therein a first bolt and the other end thereof a second aperture for receiving therein a second bolt; and, wherein said second horizontal support member has formed in one end thereof a first aperture for receiving therein a third bolt and the other end thereof a second aperture for receiving therein a fourth bolt.

* * * * *